Oct. 10, 1950        A. J. DOLAN        2,525,404
GENERATOR
Filed June 16, 1945
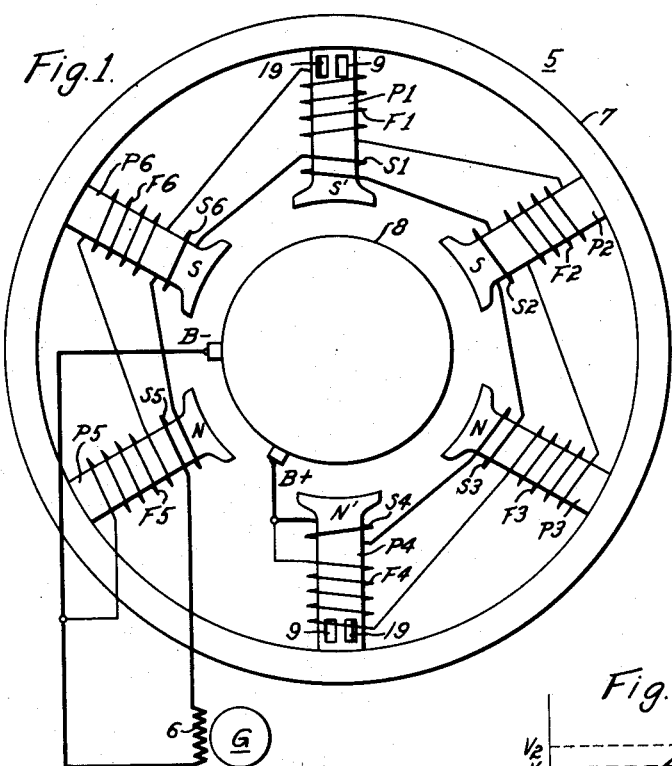
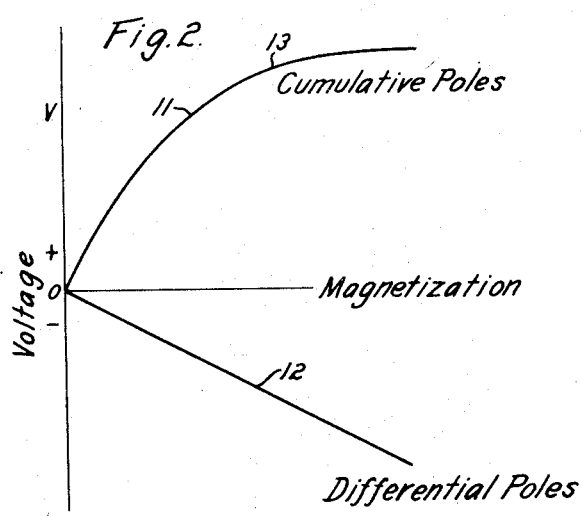
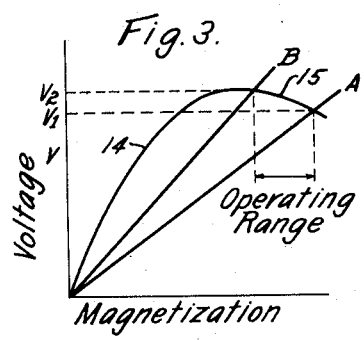
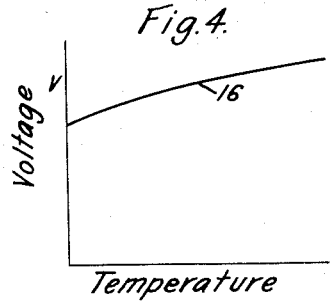
WITNESSES:
INVENTOR
Alpheus J. Dolan.
BY
ATTORNEY Patented Oct. 10, 1950

2,525,404

UNITED STATES PATENT OFFICE 2,525,404

GENERATOR

Alpheus J. Dolan, Wilkinsburg, Pa., assignor to Westinghouse Electric Corporation, East Pittsburgh, Pa., a corporation of Pennsylvania Application June 16, 1945, Serial No. 599,835

6 Claims. (Cl. 322—62)

My invention relates to a special exciter-generator, or the like, which will automatically, and without special control-devices, deliver a voltage which is lower, when the machine is cold, than when the machine is hot. When such a generator is utilized to excite the field of another machine, which may be a much larger generator, the variable voltage of the exciter-generator compensates for the change in resistance of the field-winding of the excited machine, thus preventing the voltage of the excited machine from materially varying as it becomes heated during its operation.

An object of the invention is to provide an exciter-generator having two reversed shunt field windings, on two of its poles, the generator preferably having six, or possibly four, eight or more poles, and having a two-circuit armature-winding, so that the voltages of the armature conductors under all of the poles add together, within the armature. The two reversed-excitation poles have a magnetic circuit which is designed so as to operate substantially unsaturatedly, while the other poles are normally excited, and have a magnetic circuit which is designed so as to normally operate on a saturated portion of the magnetization-curve.

With the foregoing and other objects in view, my invention consists in the machines, combinations, parts, apparatus, methods, and assemblages hereinafter described and claimed, and illustrated in the accompanying drawing, wherein Figure 1 is a diagrammatic view of an exciter-generator embodying my invention, and a very diagrammatic representation of a generator which is to be excited thereby, the excited generator being shown on a very much reduced scale, in order the better to illustrate the novel features of the exciter-generator; and Figs. 2, 3 and 4 are curve-diagrams which will be referred to in the explanation of the performance.

As shown in Figure 1, my invention is embodied in a direct-current generator 5, which is utilized as a special self-regulating exciter-generator for exciting the field-winding 6 of a large generator G, which is only very schematically indicated, on a very much reduced scale, in order to show, or suggest, the intended use for the exciter-generator 5 to which my invention especially applies.

The exciter-generator 5 has a field-member 7 having preferably six poles P1 to P6. It is possible that the number of poles might be eight, and possibly the number could be four, or more than eight, but, at any rate, more than two poles should be utilized. I am referring to the main field poles P1 to P6 of the generator, and not to the usual commutating poles or interpoles, which have been omitted for clarity, and which may, or may not, be utilized. The six poles P1 to P6 are excited by correspondingly numbered shunt field-windings F1 to F6, and usually, also, there will be series field-windings S1 to S6.

The machine 5 also has a rotatable armature which is schematically indicated, at 8, by means of a circle which represents both the armature winding and the rotatable commutator which is associated therewith. Positive and negative brushes B+ and B— bear on the commutator 8 for delivering the direct current which is generated by the machine 5. The armature-winding 8 is an ordinary two-circuit armature-winding, that is, a winding in which there are two parallel circuits from one brush to the next brush. A characteristic feature of such an armature-winding is that the voltages induced in armature-conductors under all of the stator-poles or field-poles P1 to P6 are added together, to make up the voltage appearing across the positive and negative brushes of the machine. A wave-winding is a common example of such a two-circuit armature-winding.

Usually, in a six-pole machine, there would be three pairs of brushes B+ and B—, with the positive brushes all connected together, and with the negative brushes all connected together, and I prefer to follow the usual practice. However, for clearness of illustration, I have omitted a showing of the second and third pair of brushes, so that the operation can be more clearly shown. Since the armature-winding 8 is an ordinary winding, as previously stated, and since the machine would usually have as many pairs of brushes B+ and B— as there are pairs of poles, as just stated, it follows that the armature is wound for the same number of poles as the total number of main poles.

In accordance with my present invention, two of the six main poles P1 to P6 are special, in two ways. I prefer that these two special poles shall be diametrically opposite each other, and I have illustrated the poles P1 and P4 as the two special poles. The two special features about these poles P1 and P4 are as follows: first, the shunt field windings F1 and F4 of these two special poles are reversed with respect to their normal polarity, so that the poles are south (S') and north (N'), instead of being north (N) and south (S), respectively; and second, the magnetic circuit of these two special poles is such as to operate substantially unsaturatedly, this result being most conveniently brought about by having one or more holes or cut-away portions 9 near the rear of each of these special pole-pieces P1 and P4, to produce a reduced iron-section at this point, which saturates and operates like an air gap for preventing the saturation of the rest of the iron of said two special poles P1 and P4. The rest of the poles, namely P2, P3, P5 and P6, are normally excited and normally saturated, that is, they operate on a saturated portion of their magnetization-curve, under normal operating-conditions of the machine.

Fig. 2 is a magnetization or saturation-curve for the two systems of poles, considered as operating individually on the armature-conductors. The magnetization-curve for the normally excited poles P2, P3, P5 and P6, which may be referred to as the cumulative poles, is indicated at 11 in Fig. 2, while the magnetization-curve for the reversed or differential poles P1 and P4 is indicated at 12 in Fig. 2. It is noted that the cumulative-pole curve 11 is an ordinary saturation-curve, having a saturation-hump at about 13. The differential-pole curve 12 is substantially a straight line, as indicated in Fig. 2.

The net saturation-curve, for the algebraic sum of the two curves 11 and 12 in Fig. 2, is indicated at 14 in Fig. 3. It will be noted that this curve has a drooping-voltage portion, as indicated at 15 in Fig. 3.

My new machine 5 is a self-excited machine, that is, the shunt field-windings F1 to F6 are all energized from the voltage which is generated across the positive and negative brushes B+ and B− of the machine. The operation of the machine depends upon the variation of the resistance of its shunt field coils F1 to F6, due to their change in temperature after the machine has been operating for a while. It is intended that this change in temperature will have about the same temperature-change and about the same time of change as the field-coil 6 of the machine G which is being excited. At some low temperature, when the machine 5 first commences operation, the field-resistance will be low, as indicated by the resistance-line A in Fig. 3, and a low voltage $V_1$ will be produced, as indicated in Fig. 3. At some higher temperature, the field-resistance line will be B, and the resultant voltage will be $V_2$. If the field is designed to operate within the range $V_1$ to $V_2$, as indicated in Fig. 3, the voltage-versus-temperature curve will be as indicated at 16 in Fig. 4, from which it is apparent that the voltage V rises, as the temperature increases.

As previously noted, the machine 5 is preferably compounded, and preferably the compounding is accomplished by using a series or compounding winding S1 to S6 on all of the poles. These compounding windings are wound in the ordinary polarity, that is, in the polarity which they would have for an ordinary machine, so that the series windings S2, S3, S5 and S6, on the normally excited poles P2, P3, P5 and P6, are cumulative with respect to the corresponding shunt windings F2, F3, F5 and F6, while the series windings S1 and S4, on the two differential poles P1 and P4, oppose the ampere-turns of the shunt windings S1 and S4 on these particular poles.

I have indicated a connection in which all six of the shunt windings F1 and F6 are in series with each other, so that they are all energized in a single shunt circuit connected across the output-brushes of the machine. It should be understood, of course, that the six shunt fields F1 to F6 could all be connected in parallel, or in any series-parallel combination. Adjustment of the operating-characteristics of the machine, to accommodate manufacturing variations, or to accommodate diverse requirements of the particular field of application of the machine, may be made by any suitable means, as by sliding one or more iron sections 19 in and out of the holes 9 in the backs of the two reversed or differential poles P1 and P4. This will alter the magnitude of the voltage delivered by the differential poles, as indicated by the slope of the line 12 in Fig. 2, thereby changing the magnitude and the slope of the output-voltage, as indicated by the curves 15 and 16 of Figs. 3 and 4.

I prefer that my special exciter-machine 5 shall have more than four poles P1 to P6, because, in a four-pole machine, there would be a greater loss of efficiency entailed in reversing two of the poles, and the differential-pole effect would be quite strong, with respect to the cumulative-pole action. In a six-pole machine, the loss of efficiency, due to reversing two of the poles, is not very great, and the differential-pole effect is usually just about right. In some cases, however, an eight-pole machine might be utilized, or even more than eight poles. In any event, the pole-number should be greater than two.

For the purpose of maintaining a mechanical balance between the magnetic pulls which are exerted by the field-pole fluxes on opposite sides of the armature 8, it is desirable for the two reversed poles to be diametrically opposite to each other, or at least approximately diametrically opposite, although the conditions would not be intolerable, in general, if the two reversed poles were adjacent to each other.

For the sake of magnetic symmetry, I also prefer that the two reversed poles shall be of opposite polarities, that is, one a north pole and one a south pole, although this limitation is probably not obligatory.

In operation, therefore, my exciter-generator 5 produces a voltage V which has a rising characteristic 16, as shown in Fig. 4, as the temperature of the machine rises after it has been put into operation. If the excited machine G is put into operation at the same time, and if its rising temperature-characteristic is of the same sort as the exciter-machine 5, then the rising voltage-characteristic 16 of the exciter-generator will just about match the rising field-winding resistance of the field-winding 6 of the excited generator G, so that the field-excitation of the generator G will remain constant.

While I have illustrated my invention in a single preferred form of embodiment, it should be obvious that various changes of addition, omission, or substitution may be made by those skilled in the art, without departing from the essential spirit of my invention. I desire, therefore, that the appended claims shall be accorded the broadest construction consistent with their language.

I claim as my invention:

1. A direct-current generator having a field member having not less than four main poles, exciting means for said main poles including self-excited main shunt field windings, a rotatable armature having a two-circuit armature winding, said armature winding being wound for the same number of poles as the total number of main field poles of the generator, a commutator associated with said armature winding, and positive and negative brushes bearing on said commutator for delivering the direct current which is generated by the generator, the self-excited shunt field windings being excited from said brushes, the shunt field windings on two of said main poles being reversed in polarity with respect to their normal polarity, so that the entire shunt field magnetizations of said two main poles are differential in their effect with respect to the shunt field magnetizations of the remaining main poles, said two main poles having magnetic circuits which are substantially unsaturated during operation of the generator, and the remaining main poles being normally excited and having a magnetic circuit which is at least partially saturated during normal operation.

2. A direct-current generator having a field member having not less than four main poles, exciting means for said main poles including self-excited main shunt field windings, a rotatable armature having a two-circuit armature winding, said armature winding being wound for the same number of poles as the total number of main field poles of the generator, a commutator associated with said armature winding, and positive and negative brushes bearing on said commutator for delivering the direct current which is generated by the generator, the self-excited shunt field windings being excited from said brushes, the shunt field windings on two of said main poles being reversed in polarity with respect to their normal polarity, so that the entire shunt field magnetizations of said two main poles are differential in their effect with respect to the shunt field magnetizations of the remaining main poles, one of said two main poles being a north pole and the other a south pole, and said two main poles having magnetic circuits which are substantially unsaturated during operation of the generator, and the remaining main poles being normally excited and having a magnetic circuit which is at least partially saturated during normal operation.

3. A direct-current generator having a field member having not less than four main poles, exciting means for said main poles including self-excited main shunt field windings, a rotatable armature having a two-circuit armature winding, said armature winding being wound for the same number of poles as the total number of main field poles of the generator, a commutator associated with said armature winding, and positive and negative brushes bearing on said commutator for delivering the direct current which is generated by the generator, the self-excited shunt field windings being excited from said brushes, the shunt field windings on two of said main poles being reversed in polarity with respect to their normal polarity, so that the entire shunt field magnetizations of said two main poles are differential in their effect with respect to the shunt field magnetizations of the remaining main poles, said two main poles being diametrically opposite to each other, and said two main poles having magnetic circuits which are substantially unsaturated during operation of the generator, and the remaining main poles being normally excited and having a magnetic circuit which is at least partially saturated during normal operation.

4. A direct-current generator having a field member having not less than four main poles, exciting means for said main poles including self-excited main shunt field windings, a rotatable armature having a two-circuit armature winding, said armature winding being wound for the same number of poles as the total number of main field poles of the generator, a commutator associated with said armature winding, and positive and negative brushes bearing on said commutator for delivering the direct current which is generated by the generator, the self-excited shunt field windings being excited from said brushes, the shunt field windings on two of said main poles being reversed in polarity with respect to their normal polarity, so that the entire shunt field magnetizations of said two main poles are differential in their effect with respect to the shunt field magnetizations of the remaining poles, said two main poles having magnetic circuits which are substantially unsaturated during operation of the generator, and the remaining main poles being normally excited and having a magnetic circuit which is at least partially saturated during normal operation, said exciting means also including a series field winding on each main pole, the series field windings being normally wound so that the series field excitation opposes the shunt field excitation on said two reversed-excitation poles and is cumulative with the shunt field excitation on the remaining main poles.

5. A direct-current generator having a field member having not less than four main poles, exciting means for said main poles including self-excited main shunt field windings, a rotatable armature having a two-circuit armature winding, said armature winding being wound for the same number of poles as the total number of main field poles of the generator, a commutator associated with said armature winding, and positive and negative brushes bearing on said commutator for delivering the direct current which is generated by the generator, the self-excited shunt field windings being excited from said brushes, the shunt field windings on two of said main poles being reversed in polarity with respect to their normal polarity, so that the entire shunt field magnetizations of said two main poles are differential in their effect with respect to the shunt field magnetizations of the remaining main poles, one of said two main poles being a north pole and the other a south pole, and said two main poles having magnetic circuits which are substantially unsaturated during operation of the generator, and the remaining main poles being normally excited and having a magnetic circuit which is at least partially saturated during normal operation, said exciting means also including a series field winding on each main pole, the series field windings being normally wound so that the series field excitation opposes the shunt field excitation on said two reversed-excitation poles and is cumulative with the shunt field excitation on the remaining main poles.

6. A direct-current generator having a field member having not less than four main poles, exciting means for said main poles including self-excited main shunt field windings, a rotatable armature having a two-circuit armature winding, said armature winding being wound for the same number of poles as the total number of main field poles of the generator, a commutator associated with said armature winding, and positive and negative brushes bearing on said commutator for delivering the direct current which is generated by the generator, the self-excited shunt field windings being excited from said brushes, the shunt field windings on two of said main poles being reversed in polarity with respect to their normal polarity, so that the entire shunt field magnetizations of said two main poles are differential in their effect with respect to the shunt field magnetizations of the remaining main poles, said two main poles being diametrically opposite to each other, and said two main poles having magnetic circuits which are substantially unsaturated during operation of the generator, and the remaining main poles being normally excited and having a magnetic circuit which is at least partially saturated during normal operation, said exciting means also including a series field winding on each main pole, the series field windings being normally wound so that the series field excitation opposes the shunt field excitation on said two reversed-excitation poles and is cumulative with the shunt field excitation on the remaining main poles.

ALPHEUS J. DOLAN.

REFERENCES CITED

The following references are of record in the file of this patent:

UNITED STATES PATENTS

| Number | Name | Date |
| --- | --- | --- |
| 608,309 | Steinmetz | Aug. 2, 1898 |
| 1,202,752 | Newton | Oct. 24, 1916 |
| 1,976,499 | Hochstetter | Oct. 9, 1934 |
| 2,148,296 | Hull | Feb. 21, 1939 |
| 2,325,407 | Kaufmann | July 27, 1943 |

FOREIGN PATENTS

| Number | Country | Date |
| --- | --- | --- |
| 110,798 | Austria | Oct. 10, 1928 |